United States Patent
Zenkus et al.

(10) Patent No.: US 10,165,728 B2
(45) Date of Patent: Jan. 1, 2019

(54) EDGER WITH SHIELDING ASSEMBLY

(71) Applicant: ECHO INCORPORATED, Lake Zurich, IL (US)

(72) Inventors: Joseph John Zenkus, Lake in the Hills, IL (US); Eric Kar Wai Lee, Mundelein, IL (US)

(73) Assignee: Echo Incorporated, Lake Zurich, IL (US)

( * ) Notice: Subject to any disclaimer, the term of this patent is extended or adjusted under 35 U.S.C. 154(b) by 35 days.

(21) Appl. No.: 15/406,898

(22) Filed: Jan. 16, 2017

(65) Prior Publication Data

US 2017/0202141 A1     Jul. 20, 2017

Related U.S. Application Data

(60) Provisional application No. 62/279,077, filed on Jan. 15, 2016.

(51) Int. Cl.
*A01D 34/84* (2006.01)
*A01D 101/00* (2006.01)

(52) U.S. Cl.
CPC .......... *A01D 34/84* (2013.01); *A01D 2101/00* (2013.01)

(58) Field of Classification Search
CPC ........ A01D 34/84; A01D 34/52; A01D 34/56; A01D 34/62; A01D 2101/00
See application file for complete search history.

(56) References Cited

U.S. PATENT DOCUMENTS

| | | | | |
|---|---|---|---|---|
| 2,663,137 A * | 12/1953 | Asbury | ............... | A01D 34/4168 125/3 |
| 2,787,107 A * | 4/1957 | Strasel | ................... | A01D 34/84 56/16.9 |
| 2,791,082 A * | 5/1957 | McDonough | .......... | A01D 34/84 56/13.4 |
| 2,791,875 A * | 5/1957 | Faas | ........................ | A01D 34/84 172/14 |
| 2,812,631 A * | 11/1957 | Koch | ...................... | A01D 34/84 56/246 |
| 2,847,813 A * | 8/1958 | Hanson, Jr. | ............ | A01D 34/84 172/15 |
| 3,018,602 A * | 1/1962 | Diesterweg | ............ | A01D 34/84 172/15 |

(Continued)

*Primary Examiner* — Jamie L McGowan
(74) *Attorney, Agent, or Firm* — Wood, Phillips, Katz, Clark & Mortimer

(57) ABSTRACT

An edger has a main frame that can be advanced controllably relative to subjacent terrain and a cutting assembly on the main frame. A drive rotates the cutting assembly around a first axis. The cutting assembly is configured to produce a trench in underlying terrain as the cutting assembly is rotated by the drive in operation. The cutting assembly has a perimeter edge with a contour extending over an axial distance. A shielding assembly defines a radially inwardly facing surface that resides radially outside of the perimeter edge of the cutting assembly. The radially inwardly facing surface has a shape that is at least nominally matched to the contour of an axial extent of the perimeter edge of the cutting assembly so that as the cutting assembly rotates the radially inwardly facing surface and perimeter edge of the cutting assembly cooperate to each avoid buildup of foreign matter on the other.

18 Claims, 8 Drawing Sheets

(56) References Cited

U.S. PATENT DOCUMENTS

| | | | | |
|---|---|---|---|---|
| 3,086,596 A * | 4/1963 | Allegretti | A01G 3/062 | 16/110.1 |
| 3,448,812 A * | 6/1969 | Peters | A01D 34/84 | 172/15 |
| 3,530,653 A * | 9/1970 | Ott | A01D 34/84 | 56/17.1 |
| 3,679,003 A * | 7/1972 | Wadsworth | A01D 34/84 | 172/15 |
| 3,803,819 A * | 4/1974 | Ehrlich | A01D 34/84 | 56/17.1 |
| 3,852,944 A * | 12/1974 | Zuercher | A01D 34/84 | 172/14 |
| 4,396,067 A * | 8/1983 | Enters | B62D 51/001 | 172/42 |
| 4,463,544 A * | 8/1984 | Carsello | A01G 3/062 | 172/13 |
| 4,939,854 A * | 7/1990 | Boren | E02F 3/188 | 172/42 |
| 5,116,162 A * | 5/1992 | Burhite | A01D 34/84 | 172/15 |
| 5,383,330 A * | 1/1995 | Yokocho | A01D 34/84 | 172/15 |
| 5,490,371 A * | 2/1996 | Potucek, III | A01D 34/84 | 56/17.2 |
| 6,302,219 B1 * | 10/2001 | Filippini | A01B 1/065 | 172/15 |
| 6,464,015 B1 * | 10/2002 | Jones | A01B 1/065 | 172/15 |
| 6,688,404 B2 * | 2/2004 | Uhl | A01G 3/062 | 172/15 |
| D608,797 S * | 1/2010 | Peterson | D15/11 | |
| 7,743,839 B1 * | 6/2010 | Peterson | A01D 34/84 | 172/15 |
| 7,806,196 B2 * | 10/2010 | Peterson | A01G 3/062 | 172/15 |
| 8,387,261 B2 * | 3/2013 | Voyer | A01G 23/067 | 144/2.1 |
| 8,528,236 B2 * | 9/2013 | Simpson | A01B 33/028 | 37/91 |
| 9,095,098 B2 * | 8/2015 | Guenther | A01G 3/062 | |
| 9,107,352 B2 * | 8/2015 | Stark | A01G 3/062 | |
| 2005/0241837 A1 * | 11/2005 | Notaras | A01D 34/84 | 172/17 |
| 2013/0228350 A1 * | 9/2013 | Guenther | A01G 3/062 | 172/15 |
| 2017/0202141 A1 * | 7/2017 | Zenkus | A01D 34/84 | |

\* cited by examiner

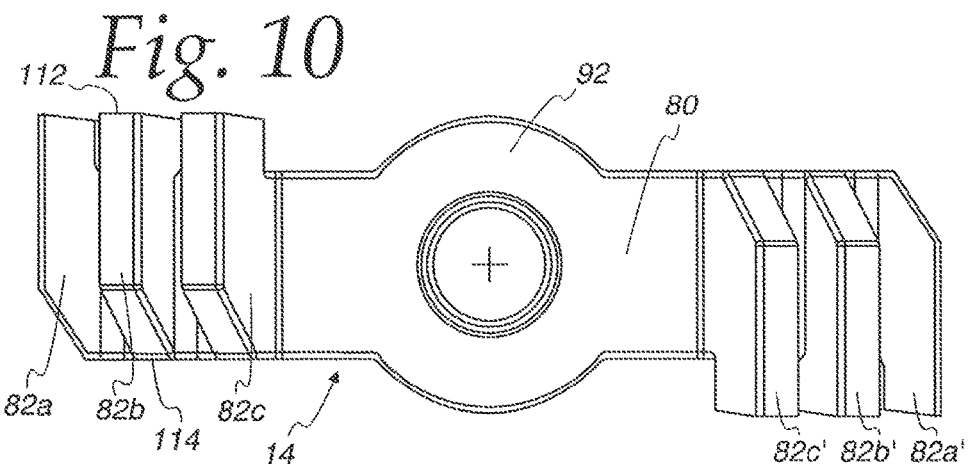
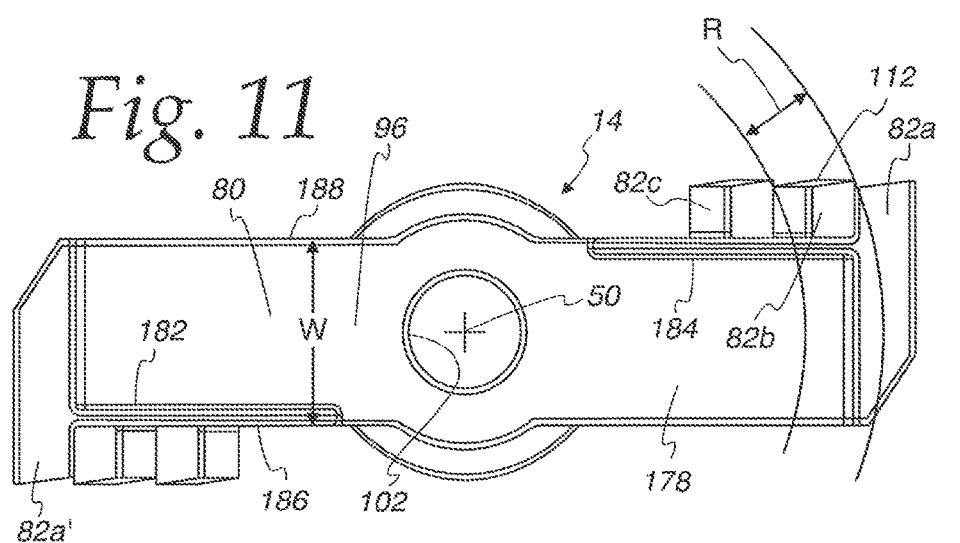
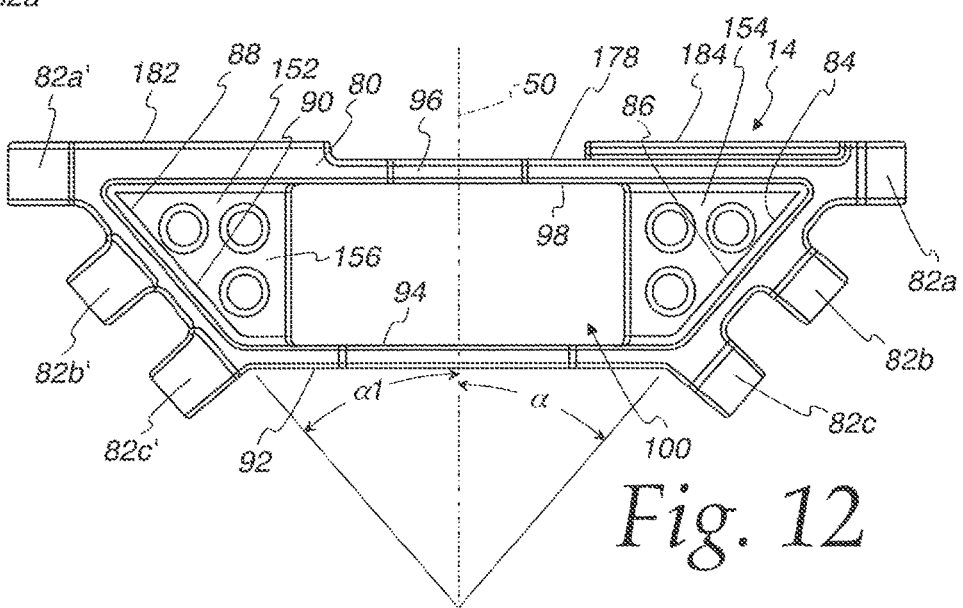

EDGER WITH SHIELDING ASSEMBLY

BACKGROUND OF THE INVENTION

Field of the Invention

This invention relates to agricultural edgers and, more particularly, to an agricultural edger having a shielding assembly to control dirt and debris generated during operation of the edger.

Background Art

Many different types of landscaping edgers are currently commercially available. One category of edger utilizes a cutting assembly that creates a trough with a tapering depth along its width. Examples of this type of edger are shown in U.S. Pat. Nos. 7,743,839 and 7,806,196.

During operation of this type of edger, a significant amount of dirt and debris is generated by the rotating cutting assembly. Shielding assemblies incorporated into these edgers have a primary function of controlling the generated dirt and debris so that it is not propelled towards the operator and can be controllably deposited adjacent to a trough as it is formed.

Because these edgers are used to create troughs in different ground types, the nature of the material generated during operation may vary significantly, from loose dirt to compacted clay. The edgers are not only required to operate in different compositions but also under different conditions that may change the nature of the ground material from one day to the next. That is, dirt that may exist as loose particles in dry conditions may assume the form of a slurry or a tightly compacted mass after absorbing moisture from rain and melted snow.

Heretofore, shielding assemblies have been somewhat generically designed to effectively perform their shielding function without consideration given to minimizing progressive buildup of material on the cutting assembly, the underside of the shielding assembly, and other parts of the edger. This accumulation problem persists primarily when there are relatively large spaces between the cutting assembly and the shielding assembly built into the design. This problem is particularly significant when the edger is operated in conditions wherein the ground material tends to clot, as when it is moist. This unwanted accumulation of dirt and debris creates unique challenges for edger designers and creates a number of operational problems for users of the edger.

Most significantly, if a progressive accumulation occurs in the space between the shielding assembly and the cutting assembly, eventually the cutting assembly becomes effectively fully surrounded by the material and moves within a groove closely matched to its shape. Thus, the debris is not allowed to separate from the cutting assembly and move against the shielding assembly to be controllably discharged in the manner intended for the design. As additional dirt and debris are separated by the cutting assembly with this condition in existence, the dirt and debris may be randomly discharged, and potentially may contact the user.

To alleviate this problem, a user may have to shut down the edger and manually break loose the compacted materials. This represents an inconvenience and causes unwanted downtime. Further, once the materials are allowed to build up and compact, it may be difficult to manually separate the same. This may require the use of tools or other objects to effect meaningful cleaning. Depending upon the environmental conditions, after effecting the cleaning, this condition may re-present itself after a relatively short additional operating time.

Still further, the accumulation of material on the edger may add significant weight thereto. This added weight may make it more difficult for the user to lift and maneuver the edger during operation, transportation, and cleaning.

In some designs, the accumulation of moist material may progress to the point that there is a mass that produces a wedge that precludes consistent alignment of the edger with the region to be treated. Such an accumulation may also eventually cause binding of the cutting assembly, which may excessively stress the edger drive component and other components thereof, potentially leading to a shortened life or an instantaneous failure.

The industry continues to seek out better edger designs to address some or all of the above problems, which persist to this day.

SUMMARY OF THE INVENTION

In one form, the invention is directed to an edger having: a main frame that can be advanced controllably relative to subjacent terrain; a cutting assembly on the main frame; and a drive for rotating the cutting assembly around a first axis. The cutting assembly is configured to produce a trench in underlying terrain as the cutting assembly is rotated by the drive in operation. The produced trench has a width extending along the first axis. The cutting assembly has a perimeter edge with a contour extending over an axial distance. A shielding assembly defines a radially inwardly facing surface that resides radially outside of the perimeter edge of the cutting assembly. The radially inwardly facing surface has a shape that is at least nominally matched to the contour of an axial extent of the perimeter edge of the cutting assembly so that as the cutting assembly rotates the radially inwardly facing surface and perimeter edge of the cutting assembly cooperate to each avoid buildup of foreign matter on the other.

In one form, with the edger viewed in cross-section along a plane containing the first axis, the radially inwardly facing surface has at least one substantially straight length.

In one form, with the edger viewed in cross-section taken along a plane containing the first axis, the radially inwardly facing surface has first and second substantially straight lengths that are angled with respect to each other.

In one form, the one substantially straight length is substantially parallel to the first axis.

In one form, the one substantially straight length is at an angle to the first axis.

In one form, with the edger viewed in cross-section along a plane containing the first axis, the perimeter edge of the cutting assembly has a plurality of projections. At least one recess is formed between first and second of the projections and the one substantially straight length is substantially parallel to a line bridging the first and second projections.

In one form, the shielding assembly has an axially facing surface that faces the cutting assembly.

In one form, with the edger viewed in cross-section taken along a plane containing the first axis, the radially inwardly facing surface and axially facing surface on the shielding assembly cooperatively define a "J" shape.

In one form, the cutting assembly has an axial projection that resides adjacent to the axially facing surface on the shielding assembly to sweep debris off of the axially facing surface of the shielding assembly as the cutting assembly is rotated.

In one form, the cutting assembly is configured to produce a trench with a predetermined shape. The radially inwardly facing surface has a shape that is at least nominally matched to the predetermined shape of the trench.

In one form, the cutting assembly has a plurality of cutting teeth that dig into underlying terrain as the cutting assembly is operated to thereby cooperatively produce a trench in the underlying terrain.

In one form, with the edger viewed in cross-section taken along a plane containing the first axis, the radially inwardly facing surface and axially facing surface on the shielding assembly cooperatively define a "V" shape.

In one form, the plurality of cutting teeth are configured and arranged to cooperatively produce a "V"-shaped trench in underlying terrain.

In one form, a first cutting tooth in the plurality of cutting teeth has an elongate configuration with a leading end and a trailing end.

In one form, a second cutting tooth in the plurality of cutting teeth has the same configuration as the first cutting tooth.

In one form, each of the plurality of cutting teeth has an elongate configuration with a length extending along a first line. The lengths of the plurality of cutting teeth are each aligned generally in a circumferential direction.

In one form, the plurality of teeth are fully spaced each, each from the other.

BRIEF DESCRIPTION OF THE DRAWINGS

FIG. 10 is a side elevation view of the cutting assembly in FIGS. 8 and 9;

FIG. 11 is an elevation view of the cutting assembly taken from the side opposite that in FIG. 10;

FIG. 12 is a bottom view of the cutting assembly in FIGS. 8-11;

DETAILED DESCRIPTION OF THE PREFERRED EMBODIMENT

The present invention relates to an edger of the type disclosed in Applicant's U.S. Pat. Nos. 7,743,839 and 7,806, 196. The disclosure in U.S. Pat. No. 7,806,196 is incorporated herein by reference. The disclosure herein is based upon U.S. Pat. No. 7,743,839, which discloses the basic edger structure at issue and which forms the primary disclosure herein. The invention is described below with additions to the disclosure in U.S. Pat. No. 7,743,839.

Figure 1:
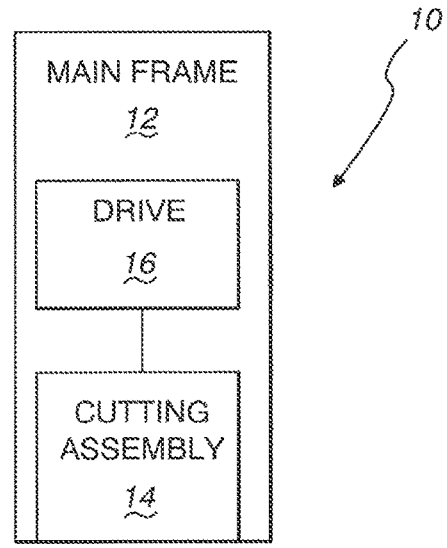
FIG. 1 is a schematic representation of an edger, according to the present invention, and having a cutting assembly powered by a drive.

In FIG. 1, an edger, of a general type into which the present invention is incorporated, is shown schematically at 10. The edger 10 consists of a main frame 12 that can be advanced controllably relative to subjacent terrain. A cutting assembly 14 is provided on the main frame 12. A drive 16 rotates the cutting assembly 14 around a first, rotary axis. The edger 10 is shown in schematic form since this showing is intended to encompass, within the inventive concept, virtually an unlimited number of variations of the components therein. The edger 10, as described in detail below, is exemplary in nature and not intended to be limiting in this regard.

Figure 2:
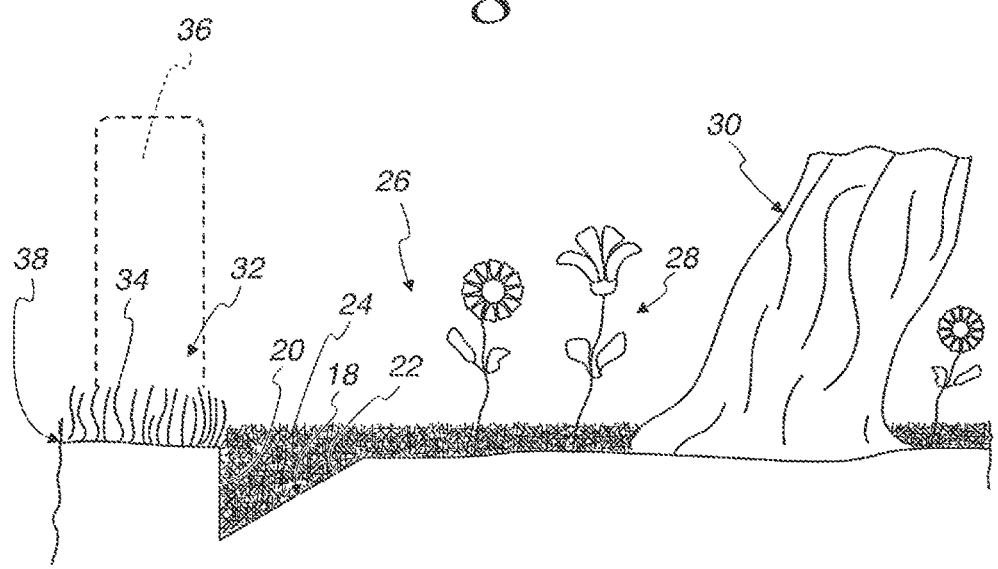
FIG. 2 is a cross-sectional view of a typical landscape location and showing a trench of a configuration that may be formed using the edger of FIG. 1.
Figure 3:
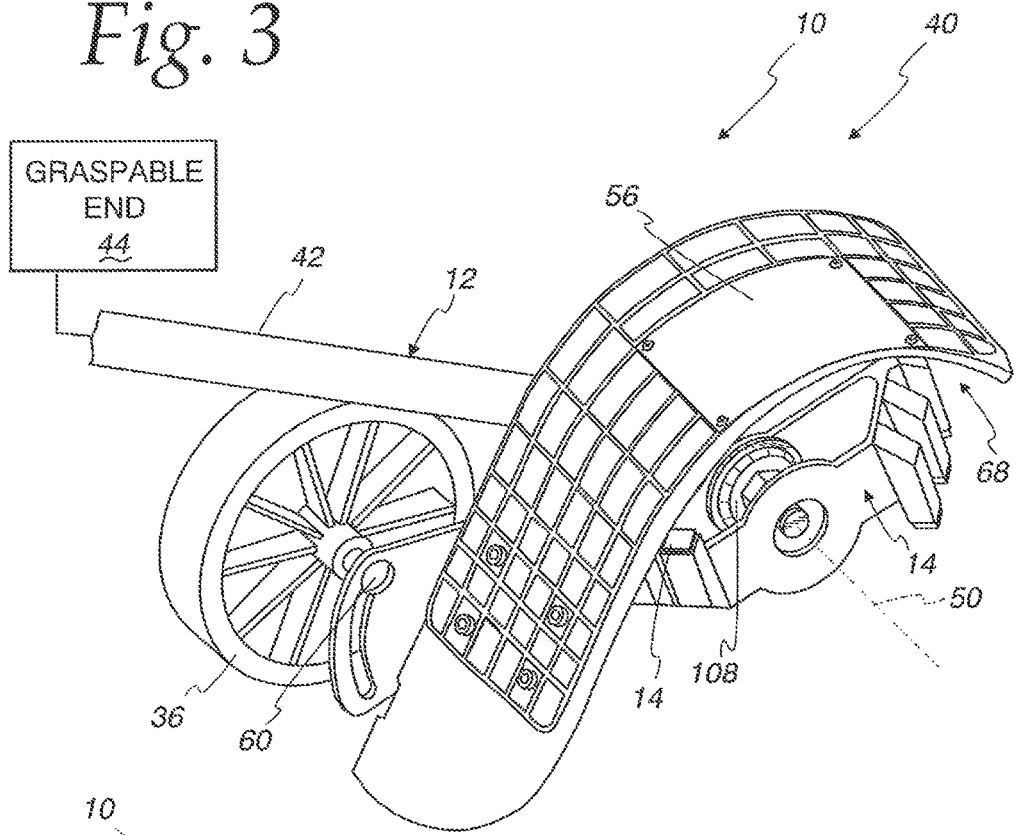
FIG. 3 is a fragmentary, partially schematic, perspective view of one specific form of the edger shown in FIG. 1.
Figure 4:
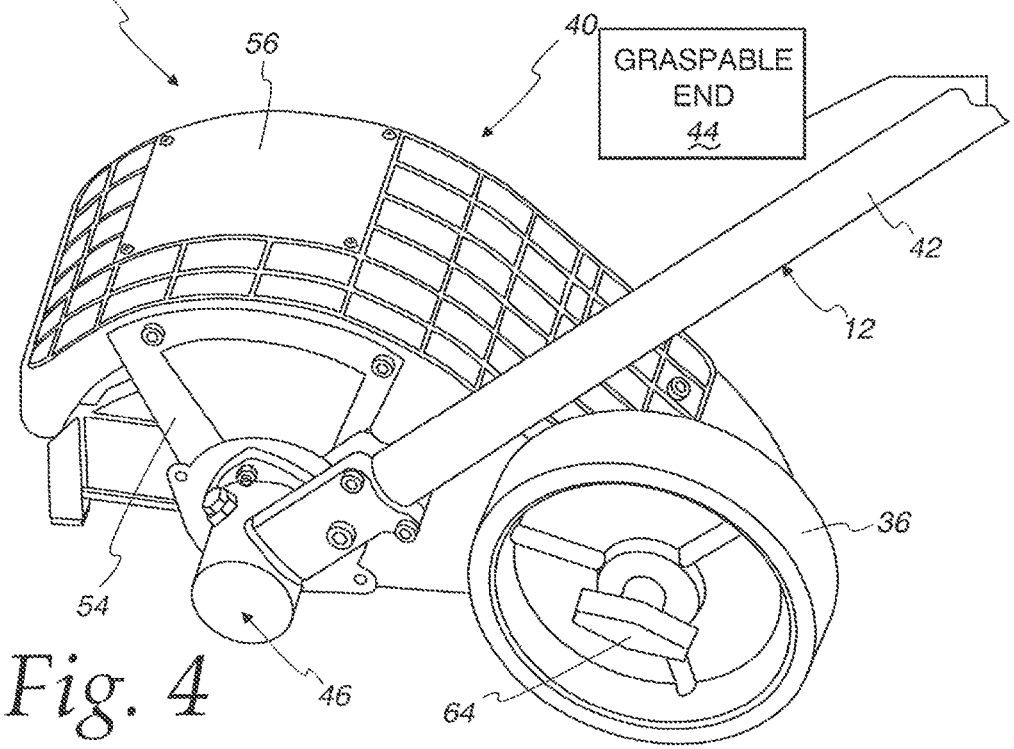
FIG. 4 is a view as in FIG. 3 from a different perspective.
Figure 5:
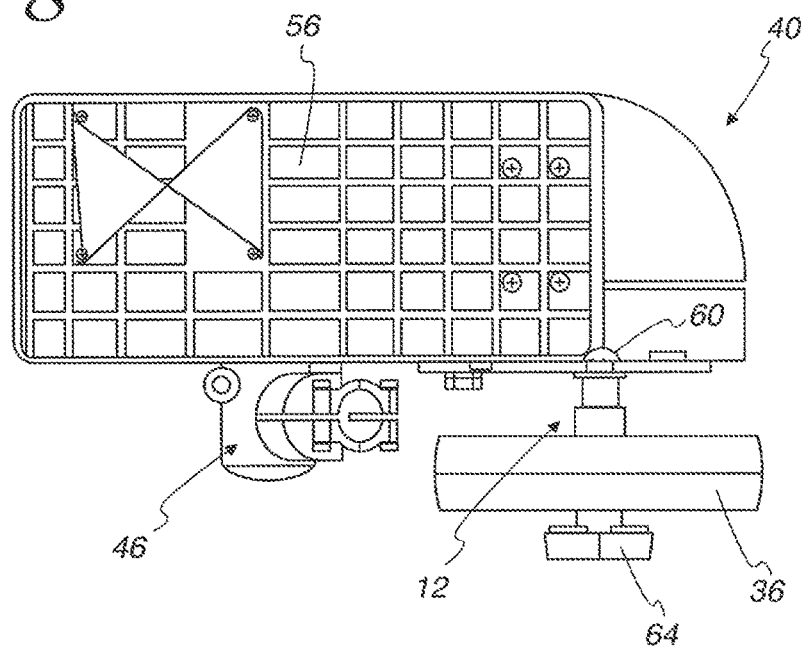
FIG. 5 is a plan view of an operating head on the edger of FIGS. 3 and 4.
Figure 6:
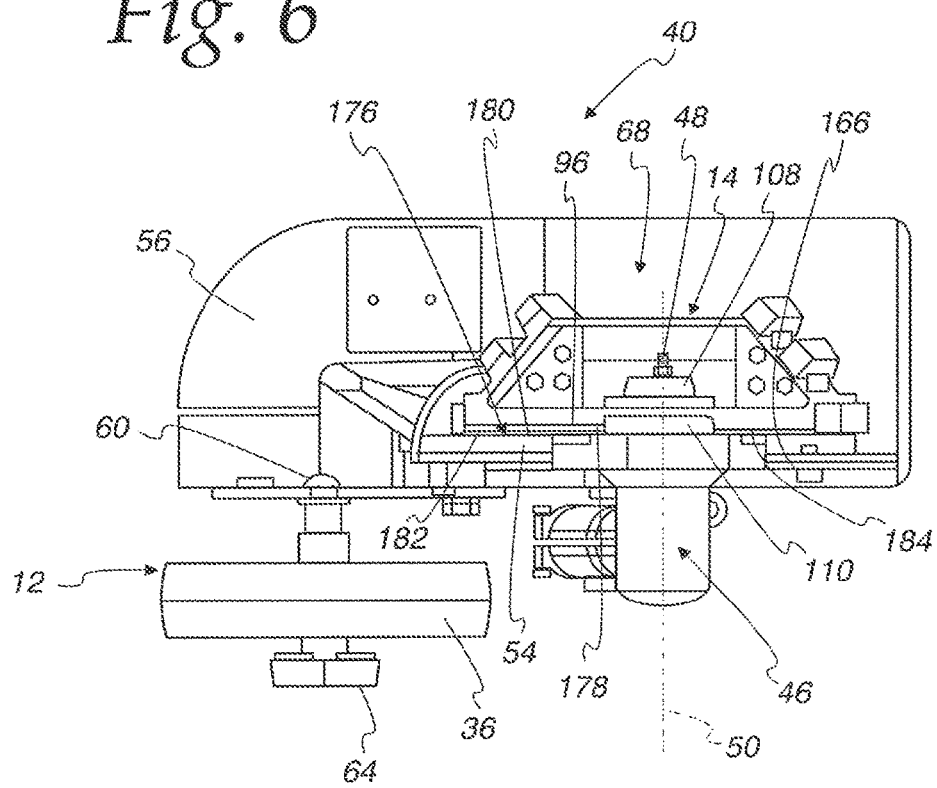
FIG. 6 is a bottom view of the edger in FIGS. 3-5.
Figure 7:
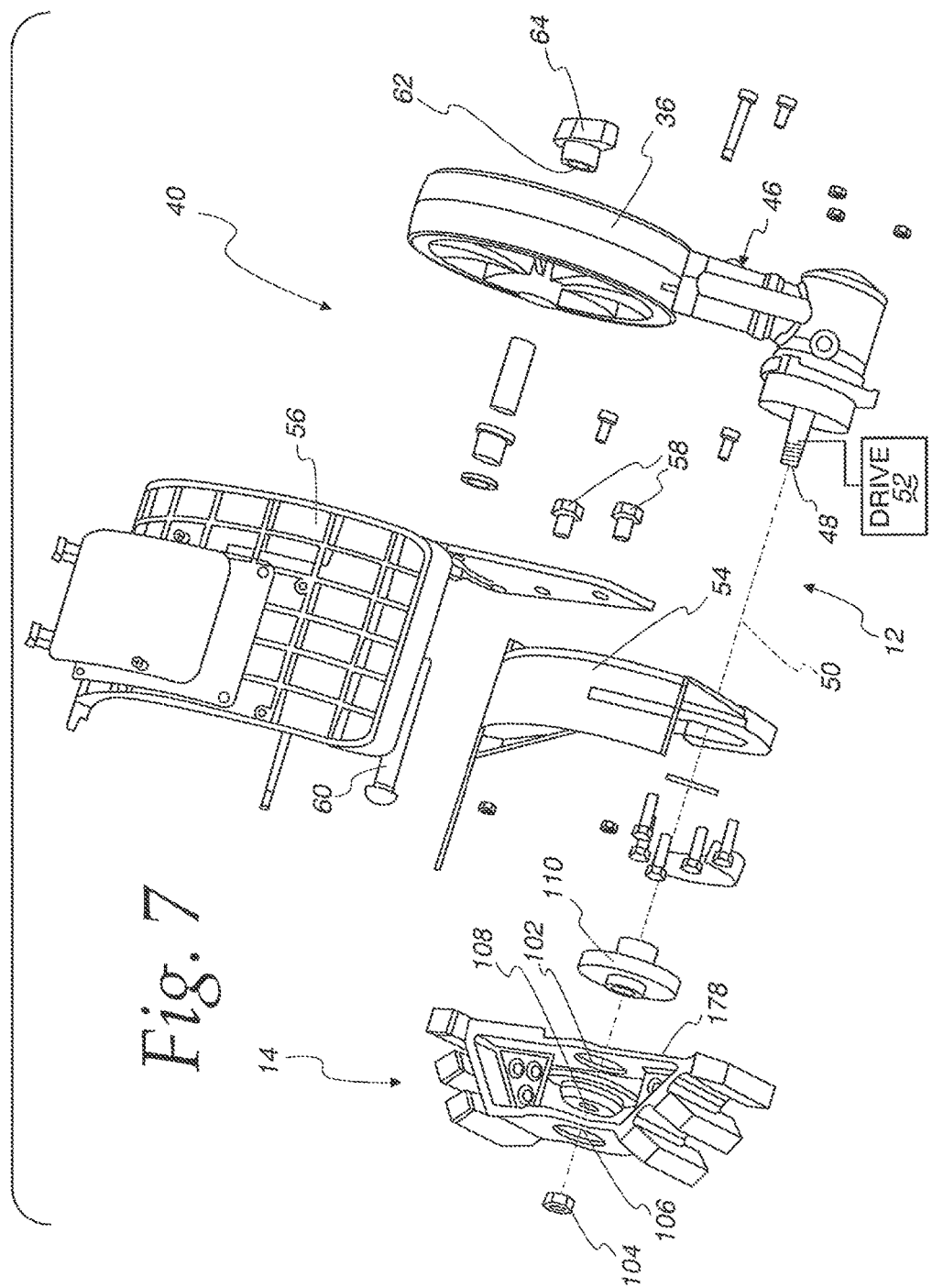
FIG. 7 is an exploded, perspective view of the operating head on the edger in FIGS. 3-6.
Figure 8:
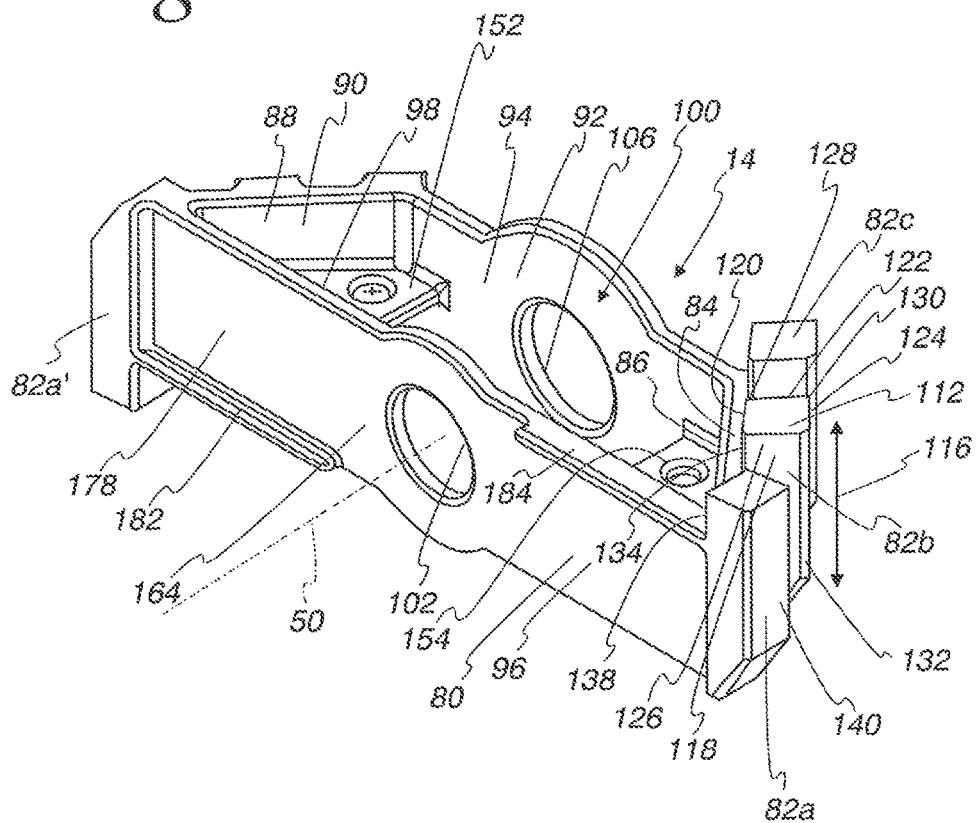
FIG. 8 is a perspective view of the cutting assembly on the edger in FIGS. 3-7.

The edger 10 is ideally one that is characterized as a beveled edger that is designed to produce a "V"-shaped trench 18, as shown in FIG. 2. The trench 18 is bounded by a vertical wall 20 and an angled wall 22 that cooperatively produce a receptacle for the placement of mulch 24, or the like, commonly used in bedding areas at 26 where there is growth such as flowers 28 and/or trees (one shown) 30. The area at 32, adjacent to the bedding area 26, is shown as lawn. The trench 18 establishes a sharp dividing line between the separate landscaping areas 26, 32. The trench 18 additionally, by reason of the depth of the vertical wall 20, limits the spread of grass 34 to the bedding area 26.

A specific form of the edger 10 will now be described with respect to FIGS. 3-15. The main frame 12 incorporates at least one wheel 36 that can be borne and rolled against underlying terrain, as shown generally at 38 in FIG. 2, during operation thereof. The wheel 36 is integrated into an operating head 40 that is manipulated by an operator through an elongate housing 42 that extends annularly and upwardly from the operating head 40. The housing 42 has a graspable end 44 that is configured to be comfortably and positively held by a user as he/she repositions the edger 10 strategically during operation thereof.

The operating head 40 includes a right angled gear box 46 with a projecting operating shaft 48. The shaft 48 is moved around a first, rotary axis 50 by a powered drive 52 that may be either on the head 40 or the housing 42. The nature of the drive 52 is not critical to the present invention. As just examples, the drive 52 could be operated electrically or through the combustion of an operating fuel.

The operating head 40 additionally includes first and second shield components 54, 56 that are joined to each other through bolts 58, and to which the wheel 36 is joined through a bolt 60 and a cooperating nut 62 integrated into a graspable knob 64.

The shield components 54, 56 cooperatively bound a shrouded chamber 68 within which the cutting assembly 14 is mounted and operates. The operating shaft 48 extends through the shield component 54 and is exposed to support the cutting assembly 14 that rotates with the shaft 48 around the first, rotary axis 50 during operation of the edger 10.

In operation, as seen in FIG. 2, the wheel 36 is advanced guidingly against and along the underlying terrain 38. As this occurs, the cutting assembly 14 produces the "V"-shaped trench 18 as shown in that same figure.

Details of the cutting assembly 14 are most clearly seen in FIGS. 8-14. The cutting assembly 14 consists of a cutting frame 80 upon which a plurality of cutting teeth 82a, 82b, 82c, 82a', 82b', 82c' (collectively 82) are located in like arrangement on diametrically opposite sides of the cutting frame 80. The cutting teeth 82 dig into the underlying terrain 38 as the cutting assembly 14 is operated, to thereby cooperatively produce the "V"-shaped trench 18 therein. In this embodiment, the teeth 82 have substantially the same configuration. This, however, is not a requirement.

The cutting frame 14 has a first wall 84 with a first flat surface 86 that makes an acute angle α with the axis 50. The cutting frame 80 has a second wall 88 with a second flat surface 90 that makes an acute angle α1 with the axis 50. The included angle between the surfaces 86, 90 (α+α1) is shown as an acute angle that is slightly less than 90°. This angle could be 90° or slightly greater.

A third wall 92 extends between the first and second walls 84, 88 and has a third flat surface 94. A fourth wall 96 extends between the first and second walls 84, 88 and has a fourth flat surface 98 that is spaced from, and substantially parallel to, the third flat surface 94.

It is not critical that the walls 84, 88, 92, 96, or their associated surfaces 86, 90, 94, 98, be perfectly flat. However, for purposes of simplicity, each of these walls 84, 88, 92, 96 can be considered elongate and flat with minimal thickness. The first, second, third and fourth walls 84, 88, 92, 96 are angularly joined, end-to-end, to cooperatively extend continuously around a trapezoidal, circumferentially opening space/shape 100.

With the cutting assembly 14 in its operative position on the operating head 40, the shaft 48 extends through a bore 102 through the wall 96 and is secured by a nut 104 that may be accessed through a bore 106 through the wall 96. The shaft 48 extends additionally through mounting components 108, 110 between which the wall 96 is captively held.

As noted above, each of the cutting teeth 82 may have the same configuration. Exemplary cutting tooth 82b has an elongate configuration with a length L (FIGS. 14 and 15) between a leading end 112 and a trailing end 114. The length L extends along a first line, indicated by the arrow 116. The first line 116 is substantially perpendicular to a radial line extending from the axis 50.

In the depicted embodiment, the tooth 82b has a squared shape, as viewed in cross section taken transversely to the length of the tooth 82b. More particularly, the cutting tooth 82b has a body 118 with a periphery defined by four flat faces 120, 122, 124, 126. In the depicted embodiment, the flat faces 120, 122, 124, 126 meet each other at vertices 128, 130, 132, 134. In the depicted form, the flat faces 120, 122, 124, 126 make a 90° angle with respect to each other at each of the vertices 128, 130, 132, 134. While not a requirement, in this embodiment all four of the faces 120, 122, 124, 126 have an equal width, whereby the cross-section of the body 118 transversely to the first line 116 is substantially square. Other squared or non-squared polygonal shapes are also contemplated.

As depicted, the tooth 82b has a substantially uniform cross-sectional shape. This shape continues over at least a majority of the length of the cutting tooth 82b, ignoring the slightly increased thickness at the face 120 whereat it connects to the wall 84. At the trailing end 114, the cutting tooth 82b is truncated, thereby to change the shape thereof from the squared shape at the leading end 112. More particularly, the truncation produces an angled, flat surface 136 that reduces hangup during operation as described hereinbelow.

The cutting tooth 82b is located on the first wall 84 with the surfaces 120, 124 thereon substantially parallel to the wall surface 86. The cutting tooth 82c is located on the wall 84 in spaced relationship with, and in substantially the same orientation as, the cutting tooth 82b.

The cutting tooth 82a has the same lengthwise alignment as the cutting teeth 82b, 82c, but is turned about its length so that its faces 138, 140, corresponding to the faces 120, 124 on the cutting tooth 82b, are parallel to each other and perpendicular to the flat surface 98.

The cutting teeth 82a', 82b', 82c' have the same relationship with the cutting frame 80 as the cutting teeth 82a, 82b, 82c do on the diametrically opposite side of the cutting assembly 14, but are inverted. That is, if one pivoted the half of the cutting assembly 14 containing the cutting teeth 82a, 82b, 82c on one side of the axis 50 180° around the axis 50, this would reproduce the arrangement of the cutting teeth 82a', 82b', 82c'.

The teeth 82 are configured and oriented so that, as shown for exemplary cutting tooth 82b, forces F from the terrain that resist cutting are aligned generally with the length of the cutting tooth 82b, substantially along the first line 116. The lengths of the teeth 82 are aligned generally in a circumferential direction so that terrain cutting is initiated and carried out primarily by the leading end 112 and potentially by the region immediately therebehind. The angle of attack between the length of the teeth 82 and underlying terrain preferably ranges from 90°±15-25°. Greater variations are contemplated, however this may significantly affect performance for reasons explained below.

The number and precise arrangement of the teeth 82 is not critical It is anticipated that at least four such teeth 82 will be required. Regardless of their number and configuration, the objective is that the cutting teeth 82 cooperatively form the desired trough shape as the cutting assembly 14 is rotated in operation.

As noted above, the primary cutting and digging action is effected through the leading ends of the cutting teeth 82 that face in a circumferential direction. The remainder of the bodies on the cutting teeth 82 are thus allowed to pass through the underlying terrain without significant resistance. This is further facilitated by the truncation of the trailing ends of the cutting teeth 82, such as that producing the surface 136 on the cutting tooth 82b. By shaping the cutting teeth 82 in this manner, the trailing ends thereof do not bind within the terrain as they pass through the concave cut region of the trench 18. At the same time, the configuration and alignment of the cutting teeth 82 causes essentially the entire weight of the teeth 82 to be moved in a concentrated mass in a path aligned with their centers. The cutting teeth 82 thus move with large momentum forces during operation of the edger 10.

As can be seen in FIG. 11, the exemplary cutting tooth 82b is oriented on the cutting assembly 14 so that the length of the cutting tooth 82b traces a path during operation that has a radial extent R with respect to the axis 50 that is substantially less than the length L of the tooth 82b.

Also, it can be seen that with the leading end 112, as shown, substantially flat and residing in a plane that is substantially orthogonal to the first line 116, the plane of the leading end 112 faces circumferentially relative to a circular shape centered on the first axis as the edger 10 is operated.

It should also be noted that the while the leading end 112 may be perfectly orthogonal to the first line 116, more preferably, there is a slight inclination of the leading end 112, as seen in FIG. 11, wherein an outermost edge at the faces 124, 126 at the leading end 112 initially contacts the underlying terrain to more aggressively effect a gouging/cutting action. This shape also tends to divert cut terrain slightly radially inwardly.

With the above-described arrangement of cutting teeth 82, bending forces upon the elongate cutting teeth 82 can be minimized by reason of directing the resistant forces generated through operation lengthwise of the cutting teeth 82. Additionally, the primary cutting is accomplished by the leading end 112 which is also positively reinforced by the remainder of the exemplary tooth 82b that is secured to the cutting frame 80. Thus, wear, if any, is limited primarily to the leading region of the teeth 82, whereupon refurbishing and/or sharpening can be relatively easily carried out, if necessary.

As the angle of attack for the teeth 82 changes from nominally 90° to a certain degree of deviation, these advantages may diminish significantly. The operating momentum for the teeth 82 may decrease. Resistant forces are applied at a greater angle to the tooth lengths and the teeth 82 thus become more prone to bending and/or breaking away from the remainder of the cutting assembly 14. In operation, greater frictional forces acting between the teeth 82 and underlying terrain may be developed that put greater strain on the entire cutting assembly 14 and its driving components.

The entire cutting assembly 14 may be a cast part. Alternatively, the cutting teeth 82 might be welded in place. Ideally, a hardened steel is used to fabricate the teeth 82. The hardened material resists abrasive wear. By maintaining the sharp edges on the cutting teeth 82, particularly at their leading ends, cutting characteristics can be maintained through a significant product life.

Figure 16:
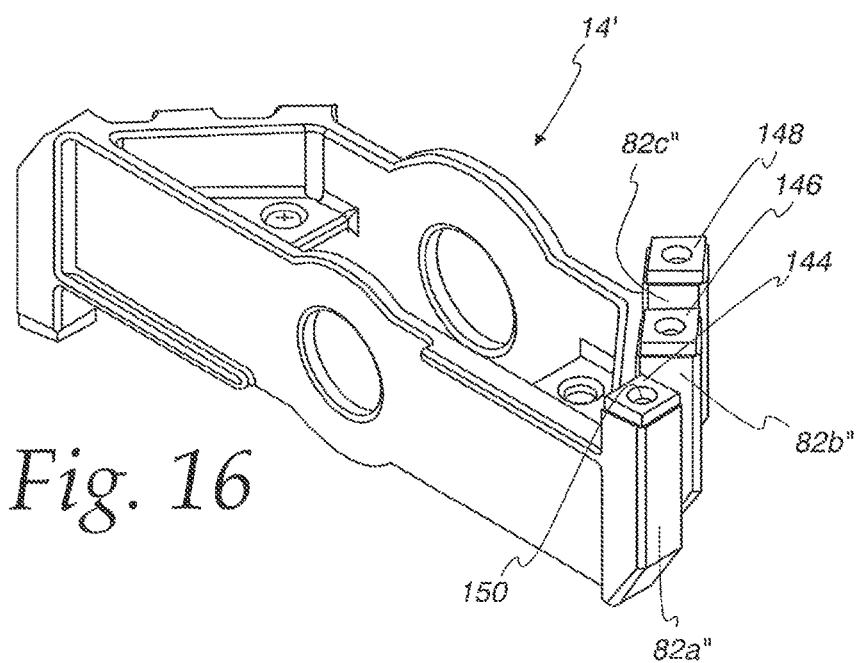
FIG. 16 is a view as in FIG. 8 of a modified form of cutting assembly, according to the present invention.

One variation of the cutting assembly 14 is shown in FIG. 16, wherein a corresponding cutting assembly is shown at 14', with substantially the same overall configuration as the cutting assembly 14, hereinabove described. The only difference resides in the provision of hardened, discrete pads/tips 144, 146, 148 at the leading ends of corresponding cutting teeth 82a", 82b", 82c". Exemplary cutting tip 144 has a central opening 150 which facilitates brazing of the tip 144 to the leading end of the cutting tooth 82a".

Each of the cutting tips 144, 146, 148 may be made from a material that effectively withstands the rigors of the cutting environment. For example, a carbide material may be used. Like tips (not shown) are provided on the remaining teeth on the cutting assembly 14'.

Many variations from the particular embodiments discussed above are contemplated. As one example, the cutting teeth need not be squared but may have any other shape, such as one with a polygonal outline that is not square, one that is a combination of curved and flatted surfaces, etc. All that is critical is that the cutting teeth cooperatively cut a trench of desired configuration in operation.

Further, the precise configuration of the trench that might be formed is not limited to that shown in FIG. 2.

Additionally, there is no requirement that the edger 10 have a wheel 36, as shown. Any structure that facilitates guided movement over an underlying terrain could be incorporated. Multiple wheels might also be used.

To avoid accumulation of material, dislodged from the underlying terrain by the cutting assembly 14, upon the edger 10, material repositioning structure is provided on the edger 10.

As seen for the exemplary cutting assembly 14, the material repositioning structure consists of first and second material moving walls 152, 154, respectively provided within the space 100. The material moving walls 152, 154 have flat surfaces 156, 158, respectively, that face in a leading circumferential direction as the cutting assembly 14 is rotated. The surfaces 156, 158 intercept and propel material dislodged from underlying terrain by the cutting assembly 14 against at least one, and potentially both, of the shielding components 54, 56 as the edger 10 is operated. This action tends to break up and potentially pulverize the dislodged material.

The wall 152 is configured to nest closely against the walls 88, 92, 96 at a mid-width location thereon, whereby the walls 88, 92, 96 project in a leading direction from the wall surface 156 to thereby define a confining rim partially around the surface 152. This arrangement creates a mechanism that effectively "scoops" dislodged material that is encountered during rotation of the cutting assembly 14.

The material moving wall 154 cooperates in a similar manner with the walls 84, 92, 96.

By keeping moving the separated material within the trench 18, that would otherwise be stagnant, churning of the cutting assembly 14 therein is avoided. This improves cutting efficiency and breakup of material that is removed to define the trench 18.

Discrete openings 160, 162 are provided through the material moving walls 152, 154, respectively, to allow selective passage of material dislodged from underlying terrain as the edger 10 is operated. Small particles are allowed to pass freely through the openings 160, 162. Particles of a size slightly larger than the openings 160, 162 might be broken up as they are forced through the openings 160, 162 in operation. This avoids the detrimental building up of such small particles upon the wall surfaces 156, 158. Since these particles are in a generally pulverized state, they do not need to be otherwise broken down by being propelled against the shield components 54, 56.

In addition to the function of scooping and propelling dislodged material, the material moving walls 152, 154 also function as gussets, each reinforcing the at least three walls between which it connects.

Figure 9:
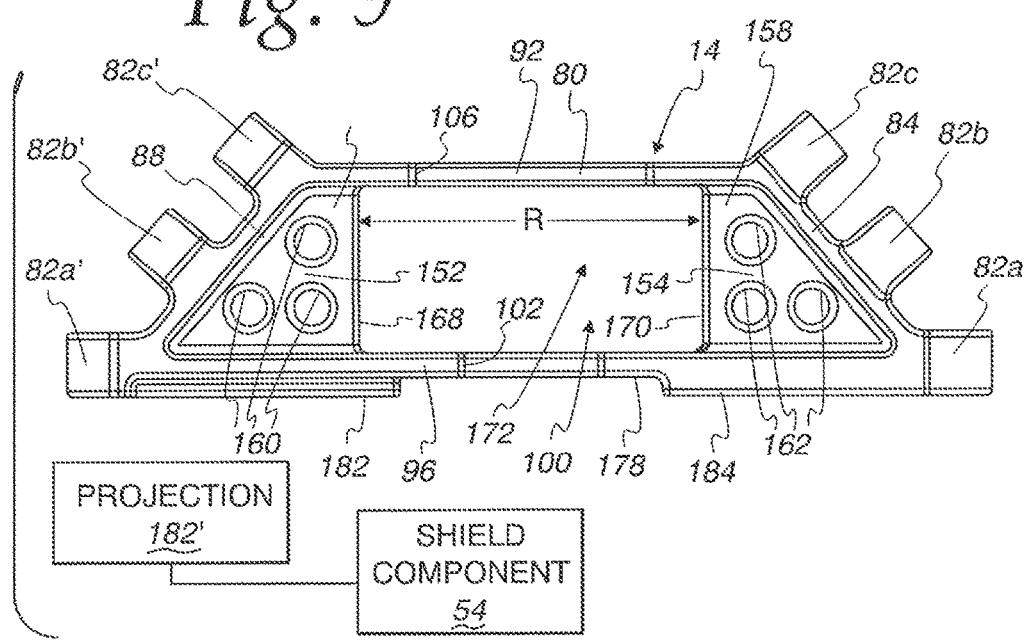
FIG. 9 is a plan view of the cutting assembly in FIG. 8.
Figure 13:
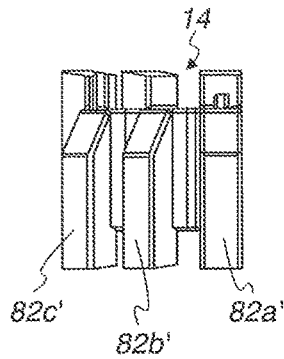
FIG. 13 is a front elevation view of the cutting assembly in FIGS. 8-12.
Figure 14:
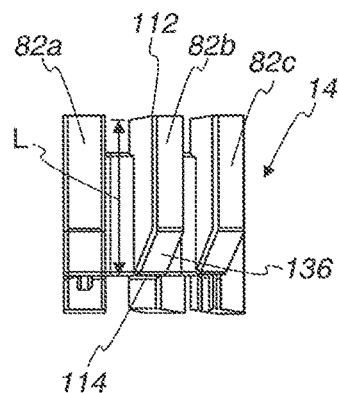
FIG. 14 is a rear elevation view of the cutting assembly in FIGS. 8-13.
Figure 15:
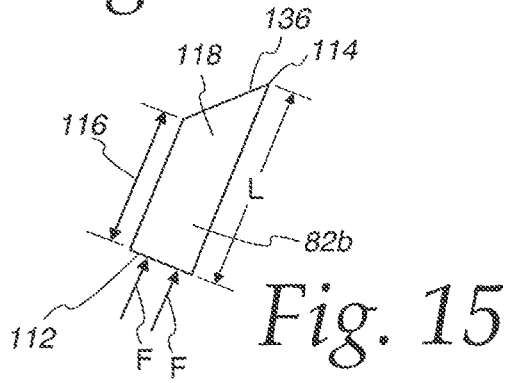
FIG. 15 is an elevation view of one of the cutting teeth on the cutting assembly in FIGS. 8-14.

The cutting frame walls 92, 96 and edges 168, 170 on the material moving walls 152, 154 bound a radial opening 172 within the space 100, as most clearly seen in FIG. 9. Through this opening, dislodged material is allowed to freely pass. The edges 168, 170 are spaced from each other in a radial direction to bound the radial dimension R of the opening 172.

The leading end 112 of the exemplary cutting tooth 82b is spaced circumferentially from the material moving wall 154 on the same side of the axis 50. The material moving wall 154 resides in a circumferentially trailing position with respect to the leading end 112 so that material dislodged by the leading end 112 of the cutting tooth 82b can be substantially instantaneously intercepted by the material moving wall 154. As noted above, the plane of the leading end 112 is not parallel to the first axis 50 and is inclined so as to deflect material dislodged by the leading end 112 towards a path traveled by the material moving wall 154 as the edger 10 is operated.

The material repositioning structure additionally avoids accumulation of dislodged material in a space 176 between an axially facing surface 178 on the wall 96 and an axially oppositely facing surface 180 on the shield component 54. In the absence of such structure, material may migrate to within the space 176 and accumulate to the point that it may cause the generation of friction that puts extra strain on the drive 52 and potentially slows the operating speed for the cutting assembly 14 to below that which is optimal. This condition may also cause abrasion on edger components that may undesirably lead to reconfiguration or, in a worst case, failure. Still further, the accumulated material may block the designed travel path for dislodged material during operation of the edger 10.

The material repositioning structure, in a broad sense, is in the form of at least one component that resides within the space 176. More particularly, one, and in this case two, projections 182, 184 are formed on the axially facing surface 170 and project, each toward the surface 180.

Each of the projections 182, 184 is in the form of an elongate fin that sweeps through the space 176. Together, the projections 182, 184 extend across substantially the full radial extent of this space 176 outward of the mounting component 110.

In the depicted form, the projections 182, 184 are spaced fully from each other. The projections 182, 184 are elongate, each with a length that is nominally aligned with the length of the cutting frame wall 96.

The cutting frame wall 96 has a width W (FIG. 11) between spaced edges 186, 188. The projection 182 defines a portion of the edge 186, with the projection 184 likewise defining a portion of the edge 188.

In FIG. 9, a projection 182', corresponding to the projection 182, is provided on the surface 180 on the shield component 54. This construction is shown as an alternative to providing one or both of the projections 182, 184 on the cutting frame 80. However, this construction, while feasible, is not preferred since accumulation of a significant amount of material may occur in the space 176 with this construction. On the other hand, with the projections 182, 184 moving at a relatively high rotational speed, the projections 182, 184 tend to sweep through the space 176 and shed any attached material, primarily through centrifugal forces acting thereupon.

While one specific form of edger is described above, the invention herein has application in a more generic sense. Essentially, the invention is concerned with the structures of the cutting assembly, shown schematically at 200 in FIG. 17, and a shielding assembly at 202, and their cooperation as a subassembly 204 on an edger. The shielding assembly 202 is an alternative construction to the aforementioned shield components 54, 56. The cutting assembly 200 includes the cutting assembly 14 and virtually an unlimited number of different types and configurations of cutting assembly capable of producing a trench by reason of rotation of the cutting assembly 200 around an axis during use.

Figure 18:
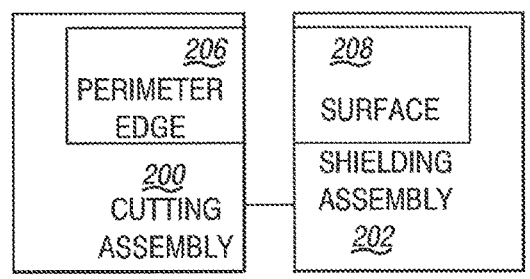
FIG. 18 is a schematic representation of the subassembly in FIG. 17 with additional detail showing cooperating components thereon.

As shown in FIG. 18, the cutting assembly 200 has a perimeter edge 206 with a contour extending over an axial distance relative to the rotational axis for the cutting assembly 200. The shielding assembly 202 defines a surface 208 with at least a portion thereof that faces radially inwardly and resides radially outside of the perimeter edge 206 of the cutting assembly 200. The radially inwardly facing surface portion 208 has a shape that is at least nominally matched to a contour of an axial extent of the perimeter edge 206 of the cutting assembly 200 so that as the cutting assembly rotates, the radially inwardly facing surface 208 and perimeter edge 206 of the cutting assembly 200 cooperate to each avoid buildup of foreign matter on the other.

Essentially, the perimeter edge 206 and surface 208 are configured and arranged so that they interact with foreign matter during operation that produces a shearing action on the foreign matter that causes each of the perimeter edge 206 and surface 208 to effectively cause a wiping action on the other of the perimeter edge 206 and surface 208.

Figure 19:
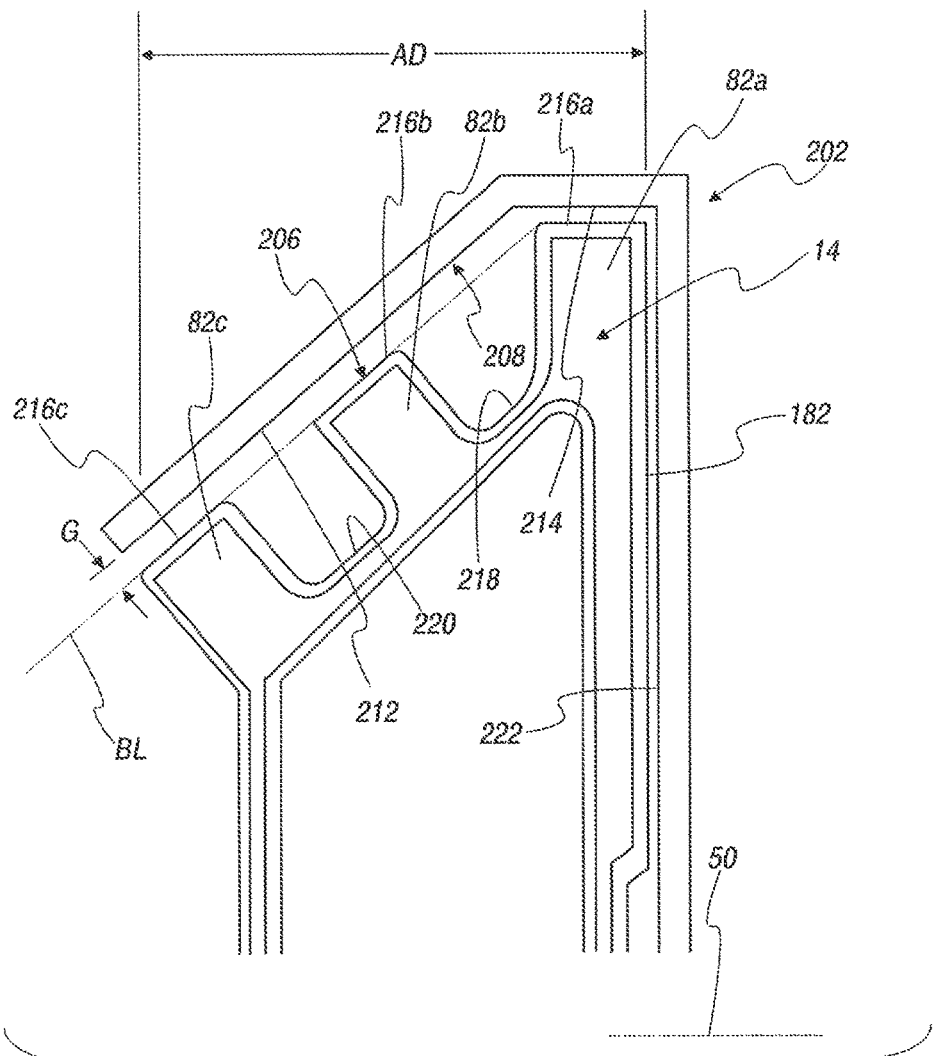
FIG. 19 is a fragmentary, cross-sectional view of one exemplary form of cutting assembly and shielding assembly, according to the present invention and as shown schematically in FIGS. 17 and 18.

One exemplary form of the shielding assembly 202 will be described with respect to FIG. 19 in relationship to the cutting assembly 14, as described above and that is rotated around the axis 50 in operation. The cutting assembly 14 is integrated into the other edger components as described above, with the only difference contemplated being the removal of the shield components 54, 56 and substitution therefor of the shielding assembly 202. Again, it should be emphasized that the specific shielding assembly 202 shown in FIG. 19 is but one exemplary form. The basic structural principles described herein could be readily used by one skilled in the art to adapt a shielding assembly to a different cutting assembly configuration to produce the desired cleaning/wiping action. The cutting assembly contemplated is virtually any cutting assembly that cuts underlying terrain to produce a trench having a significant width along the operating axis 50 for the cutting assembly 14.

FIG. 19 shows the cooperation between the cutting assembly 14 and shielding assembly 202 with the same viewed in cross-section along a plane containing the axis 50. The perimeter edge 206 of the cutting assembly 14 has a contour extending over an axial distance AD. The shielding assembly 202 defines a radially inwardly facing surface 208 that resides radially outside of the perimeter edge 206 of the cutting assembly and in relatively close proximity thereto.

The schematic showing in FIG. 18 is intended to encompass any structure wherein the radially inwardly facing surface 208 has a shape that is at least nominally matched to the contour of an axial extent of the perimeter edge 206 of the cutting assembly so that as the cutting assembly rotates, the radially inwardly facing surface 208 and perimeter edge 206 of the cutting assembly cooperate to each avoid build-up of foreign matter on the other.

In the depicted, specific, embodiment, the surface 208 has at least one substantially straight length 212 as viewed from the FIG. 19 perspective. In this embodiment, the surface 208 is made up of two straight lengths 212, 214 to conform to the perimeter edge 206. The straight lengths 212, 214 are angled with respect to each other. In this embodiment, the straight length 214 is substantially parallel to the axis 50, with the straight length 212 being angled with respect to the axis 50 and the straight length 214.

With the exemplary cutting assembly 14, the teeth 82a, 82b, 82c produce projections 216a, 216b, 216c, successively, as seen from the FIG. 19 perspective. Recesses 218, 220 are respectively formed between the projections 82a, 82band 82b, 82c. A line BL, shown bridging the projections 82b, 82c, is substantially parallel to the line of the straight length 212 of the surface 210. A slight gap G is maintained therebetween and is selected to cause a shearing action on treated ground material that produces the above-mentioned wiping action of each of the cutting assembly 14 and shielding assembly 202 by the other. In this case, the line BL is in close proximity to, or intersects, the projection 216a so that the referenced bridging line BL orientation may be established by spanning the projections 216a, 216b.

The shielding assembly 202 further has an axially facing surface 222 that faces the cutting assembly 14. The projection 182 on the cutting assembly 14 is elongate radially and projects axially to reside adjacent to the axially facing surface 222 to sweep debris therefrom as the cutting assembly 14 is rotated.

The radially inwardly facing surface 208 and the axially facing surface 222 cooperatively define a "J" shape.

In an alternative construction, the straight length 214 may be changed or eliminated, whereby the radially inwardly facing surface 208 and axially facing surface 222 cooperatively define a "V" shape.

The general "V" shape of the radially inwardly facing surface 208 and axially facing surface 222 together is approximately matched to the "V" shape of the trench that is generated by rotating the cutting assembly 14 in use.

Figure 17:
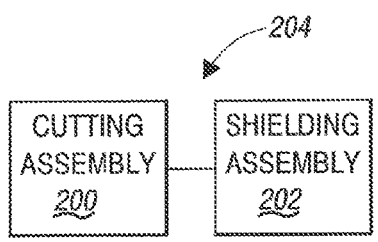
FIG. 17 is a schematic representation of a subassembly, according to the present invention, including the cutting assembly and cooperating shielding assembly.

The generic showing of the structure in FIGS. 17 and 18 is intended to encompass a shielding assembly that has surfaces that are at least nominally matched to a predetermined shape of a trench that is generated by the particular cutting assembly configuration, which is not limited to that shown herein.

Further, the invention is not limited to a construction of a cutting assembly that has a specific arrangement of teeth as hereinabove described. Virtually any other type of cutting assembly known to those in the art is contemplated.

The extent to which the surface 208 extends around the axis 50, to cooperate with the cutting assembly 14 as described, may vary significantly. The overall extent of the shielding assembly 202 around the axis 50 is dictated by how the associated edger is designed to be reoriented in operation. In one form, the arcuate extent of the shielding assembly 20 is between 90 and 180°. The surface 208 and perimeter edge 206 do not need to cooperate, as described above, over this full arcuate extent.

The foregoing disclosure of specific embodiments is intended to be illustrative of the broad concepts comprehended by the invention.

The invention claimed is:

1. An edger comprising:
a main frame that can be advanced controllably relative to subjacent terrain;
a cutting assembly on the main frame;
a drive for rotating the cutting assembly around a first axis,
the cutting assembly configured to produce a trench in underlying terrain as the cutting assembly is rotated by the drive in operation,
the produced trench having a width extending along the first axis,
the cutting assembly having a perimeter edge with a contour extending over an axial distance; and
a shielding assembly defining a radially inwardly facing surface that resides radially outside of the perimeter edge of the cutting assembly,
the radially inwardly facing surface having a shape that is at least nominally matched to the contour of an axial extent of the perimeter edge of the cutting assembly so that as the cutting assembly rotates the radially inwardly facing surface and perimeter edge of the cutting assembly cooperate to each avoid buildup of foreign matter on the other,
the radially inwardly facing surface, with the edger viewed in cross-section along a plane containing the first axis, having a non-straight shape where the radially facing surface extends over an axial extent of the perimeter edge of the cutting assembly.

2. The edger according to claim 1 wherein with the edger viewed in cross-section along a plane containing the first axis the radially inwardly facing surface, over an axial extent where the radially facing surface extends along an axial extent of the perimeter edge of the cutting assembly, has at least one substantially straight length.

3. The edger according to claim 1 wherein with the edger viewed in cross-section taken along a plane containing the first axis the radially inwardly facing surface, over an axial extent where the radially facing surface extends along an axial extent of the perimeter edge of the cutting assembly, has first and second substantially straight lengths that are angled with respect to each other.

4. The edger according to claim 2 wherein the one substantially straight length is substantially parallel to the first axis.

5. The edger according to claim 2 wherein the one substantially straight length is at an angle to the first axis.

6. The edger according to claim 2 wherein with the edger viewed in cross-section along a plane containing the first axis the perimeter edge of the cutting assembly has a plurality of projections and at least one recess between first and second of the projections and the one substantially straight length is substantially parallel to a line bridging the first and second projections.

7. The edger according to claim 1 wherein the shielding assembly comprises an axially facing surface that faces the cutting assembly.

8. The edger according to claim 7 wherein with the edger viewed in cross-section taken along a plane containing the first axis the radially inwardly facing surface and axially facing surface on the shielding assembly cooperatively define a "J" shape.

9. The edger according to claim 7 wherein the cutting assembly has an axial projection that resides adjacent to the axially facing surface on the shielding assembly to sweep debris off of the axially facing surface of the shielding assembly as the cutting assembly is rotated.

10. The edger according to claim 1 wherein the cutting assembly is configured to produce a trench with a predetermined shape and the radially inwardly facing surface has a shape that is at least nominally matched to the predetermined shape of the trench.

11. The edger according to claim 1 wherein the cutting assembly comprises a plurality of cutting teeth that dig into underlying terrain as the cutting assembly is operated to thereby cooperatively produce a trench in the underlying terrain.

12. The edger according to claim 7 wherein with the edger viewed in cross-section taken along a plane containing the first axis the radially inwardly facing surface and axially facing surface on the shielding assembly cooperatively define a "V" shape.

13. The edger according to claim 11 wherein the plurality of cutting teeth are configured and arranged to cooperatively produce a "V"-shaped trench in underlying terrain.

14. The edger according to claim 11 wherein a first cutting tooth in the plurality of cutting teeth has an elongate configuration with a leading end and a trailing end.

15. The edger according to claim 14 wherein a second cutting tooth in the plurality of cutting teeth has the same configuration as the first cutting tooth.

16. The edger according to claim 11 wherein each of the plurality of cutting teeth has an elongate configuration with a length extending along a first line and the lengths of the plurality of cutting teeth are each aligned generally in a circumferential direction.

17. The edger according to claim 16 wherein the plurality of teeth are fully spaced, each from the other.

18. An edger comprising:

a main frame that can be advanced controllably relative to subjacent terrain;

a cutting assembly on the main frame;

a drive for rotating the cutting assembly around a first axis, the cutting assembly configured to produce a trench in underlying terrain as the cutting assembly is rotated by the drive in operation, the produced trench having a width extending along the first axis, the cutting assembly having a perimeter edge with a contour extending over an axial distance; and a shielding assembly defining a radially inwardly facing surface that resides radially outside of the perimeter edge of the cutting assembly, the radially inwardly facing surface having a shape that is at least nominally matched to the contour of an axial extent of the perimeter edge of the cutting assembly so that as the cutting assembly rotates the radially inwardly facing surface and perimeter edge of the cutting assembly cooperate to each avoid buildup of foreign matter on the other, the radially inwardly facing surface, with the edger viewed in cross-section along a plane containing the first axis, having at least a portion where the radially facing surface extends along an axial extent of the perimeter edge that is non-parallel to the first axis.

* * * * *